Feb. 22, 1966     C. H. CONEY ETAL     3,236,674
PROCESS OF APPLYING A COLOR FINISH TO WOOD
Filed April 5, 1961
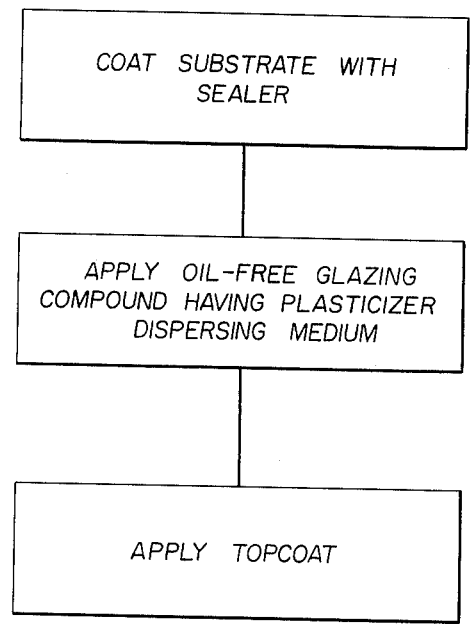
CHARLES H. CONEY
WILLIE E. DRAPER
INVENTORS
BY R. Frank Smith
Thomas W. O'Rourke
ATTORNEYS United States Patent Office 3,236,674
Patented Feb. 22, 1966

3,236,674
PROCESS OF APPLYING A COLOR FINISH TO WOOD
Charles H. Coney and Willie E. Draper, Kingsport, Tenn., assignors to Eastman Kodak Company, Rochester, N.Y., a corporation of New Jersey
Filed Apr. 5, 1961, Ser. No. 100,824
4 Claims. (Cl. 117—10)

This invention concerns a wood finishing glaze compound, more particularly the use of wood finishing glaze compounds with cellulose ester lacquers.

Glaze materials which are used extensively in the finishing of furniture and other objects of wood consist of pigments dispersed in drying oils such as linseed oil. The purpose of the glaze coating is to impart a color to the finished system in such a manner that the colored areas may be controlled by the operator and not influenced by the grain of the wood as would be the case with stains or fillers. The effect thus produced highlights the design and enhances the depth of finish. The glaze is normally applied over the sealer or topcoat to prevent penetration into the wood. Preferably, the glazes have little or no solvation effect on the previously applied coatings so that they can be easily wiped from certain areas to obtain varied effects.

Drying oil base glazes have presented many difficulties in the past. A film is formed by the drying oil which is a thermosetting material foreign to the thermoplastic lacquer system used in the mass production furniture and wood paneling. Accordingly, the lacquer topcoats do not have satisfactory adhesion to the subcoats. Moreover, oil glazes tend to reduce the cold check resistance of the coatings and a general degradation of properties of the complete coating system.

Drying oil base glazes require considerable time for drying to a state which will permit coating with the lacquer finish coat. If the glaze is overcoated before it has completely dried, a non-drying due to exclusion of air and lifting due to solvent action will result. The drying time required for a drying oil type of glaze may be from 18 to 24 hours which means a loss of time in production line operations.

We have found a method of providing a glaze which is compatible with lacquer finishing systems and which avoids the difficulties inherent in the drying oil base glazes.

One object of this invention is to provide a glaze which will be compatible with cellulose ester lacquer finishing systems used in furniture manufacturing and easily adaptable to assembly line procedures. Another object is to provide a glaze coating which requires no drying time and which may be overcoated immediately with a lacquer topcoat. A further object is to provide a glaze coating which will produce better adhesion to the undercoat and to subsequently applied coatings, thus giving better integrity to the system, resulting in improved impact resistance and cold check resistance. An additional object is to provide a glaze coating which can be modified to produce a controlled degree of "bite" into the previously applied coating thus controlling the overall degree of color obtained.

The above objects are obtained by using a chemical type plasticizer as the pigment dispersing and suspending medium. The plasticizer acts only as a carrying agent with the pigment permitting the color to be distributed over the surface in the desired manner and the plasticizer is then absorbed into the undercoat and subsequently applied coats to give a completely homogeneous system.

The use of plasticizers or plasticizer blends with different degrees of solvency for the undercoat gives the possibility of controlling the degree of "bite," thus permitting varying degrees of overall color regardless of the wiping operation. For example, a blend of a relatively non-active plasticizer such as dioctyl phthalate with a more active plasticizer such as dimethyl phthalate may be adjusted in the ratios of these two ingredients to give a slight and controlled degree of solvency for the coating to which it is applied, thus producing an even and overall color of the areas which are wiped, yet give a certain degree of color shading between the wiped and unwiped areas. The use of a relatively non-active plasticizer such as dioctyl phthalate produces application and handling properties comparable to a drying oil base glaze but without the inherent disadvantages.

All types of pigments and dyes which are normally used in drying oil base glazes are operative in our invention. These include burnt sienna, burnt umber, ochers, titanates, and the like. Dyes such as alizarin and the like and shading pigments such as sulfates may be used. It is also within the scope of our invention to use organic pigments such as the various synthetic organic pigments now available for use in paints and the like.

Blends of the plasticizers may be used, but 5 to 50 percent of the plasticizer pigment formulation should be pigment. In the event that dyes are used, a much wider variation is possible depending upon the dye used and the effect desired.

Plasticizer which are operative are those which are known as plasticizers for cellulose esters such as the phthalic acid esters including the mixed esters obtained by esterifying with an aliphatic alcohol having 1 to 8 carbon atoms. Other plasticizers include the esters of polycarboxylic acids having from 5 to 10 carbon atoms.

The drawing which shows a flow sheet illustrates a method by which the glaze may be utilized. As depicted in the flow sheet, the substrate is coated with a sealer. Then the above-discussed glaze is applied and, without necessarily waiting for the glaze to dry, the topcoat is applied.

The following examples are intended to illustrate our invention but not to limit it in any way.

*Example 1*

Pieces of different types of wood were coated with a cellulose acetate butyrate type sealer and then glaze coated with the following composition which had been ground for 24 hours in a ball mill:

| Components: | Percent by weight |
|---|---|
| Dimethyl phthalate | 35 |
| Dibutyl phthalate | 35 |
| Burnt sienna | 30 |
| | 100 |

After applying and wiping to the desired color effect, the panels were topcoated immediately with a cellulose acetate solvent base lacquer. The color was distributed rather evenly over the surfaces due to the slight "bite" into the sealer coat. After the topcoat had dried for several hours, the adhesion was checked and found to be excellent.

*Example 2*

The following composition was ground in a ball mill for 24 hours:

| Components: | Percent by weight |
|---|---|
| Dibutyl phthalate | 70 |
| Burnt sienna | 30 |
| | 100 |

This glaze was applied in the same manner as in Example 1 and was found to have excellent properties with no "bite."

*Example 3*

The following glaze was prepared and tested as in Example 2:

| Components: | Percent by weight |
|---|---|
| Dioctyl phthalate | 70 |
| Burnt sienna | 30 |
| | 100 |

The properties of this glaze were found to be comparable to that of Example 2.

*Example 4*

Glazes prepared according to the above examples were used with lacquer panels having other cellulose ester lacquers including nitrocellulose, cellulose butyrate, cellulose acetate, cellulose acetate propionate, and the like. They were also used with lacquer panels having lacquer formulations based on other systems includings urea, formaldehyde, polyurethane, polyester, etc. No limitation was found on the operability of our glaze systems as long as the plasticizer was compatible with the lacquer system used.

*Example 5*

A cellulose acetate butyrate lacquer emulsion was prepared as follows:

| Components: | Percent by weight |
|---|---|
| Cellulose acetate butyrate | 21 |
| Dimethyl phthalate | 8 |
| Toluene | 24 |
| Ethyl alcohol | 10 |
| 2-ethyl hexyl acetate | 10 |
| Surfactants | 2 |
| Water | 25 |
| | 100 |

These components were homogenized and padded on the wooden surface. After drying, the glaze compositions described in the above Examples 1–3 were used and found to be satisfactory.

The pigment is preferably ground into the plasticizers on a three-roll mill or a ball mill, but this method of suspending the pigment in the plasticizer is not critical and other methods may be used.

The glaze may be sprayed or wiped on the surface of the lacquer coating or applied by some other means providing the undercoat has been dried. Grain and design accentuations may be made by wiping portions of the glaze from certain areas.

The invention has been described in detail with particular reference to preferred embodiments thereof, but it will be understood that variations and modifications can be effected within the spirit and scope of the invention as described hereinabove and as defined in the appended claims.

We claim:

1. The process of applying a color finish to a wooden substrate which comprises coating the substrate with superimposed layers, in the order given, of a lacquer sealer, a substantially oil-free glazing compound and a lacquer topcoat, said glazing compound essentially consisting of plasticizer for the lacquer coatings, a colorant selected from the group consisting of dyes and pigments, and being substantially free of solvents for the lacquer coatings.

2. The process of applying a color finish to a wooden substrate which comprises coating the substrate with superimposed layers, in the order given, of a cellulose ester sealer, a substantially oil-free glazing compound and a cellulose ester topcoat, said glazing compound essentially consisting of plasticizer for the cellulose ester coatings, a colorant selected from the group consisting of dyes and pigments, and being substantially free of solvents for the cellulose ester coatings.

3. The process of applying a color finish to a wooden substrate which comprises coating the substrate with superimposed layers, in the order given, of a cellulose acetate butyrate sealer, a substantially oil-free glazing compound and a cellulose acetate butyrate topcoat, said glazing compound essentially consisting of plasticizer for the cellulose acetate butyrate coatings, a colorant selected from the group consisting of dyes and pigments, and being substantially free of solvents for the cellulose acetate butyrate coatings.

4. The process of applying a color finish to a wooden substrate which comprises coating the substrate with superimposed layers, in the order given, of a cellulose nitrate sealer, a substantially oil-free glazing compound and a cellulose nitrate topcoat, said glazing compound essentially consisting of plasticizer for the cellulose nitrate coatings, a colorant selected from the group consisting of dyes and pigments, and being substantially free of solvents for the cellulose nitrate coatings.

References Cited by the Examiner

UNITED STATES PATENTS

| 1,851,470 | 3/1932 | Verderosa | 117—10 |
|---|---|---|---|
| 1,941,709 | 1/1934 | Moss | 117—85 |
| 1,958,706 | 5/1934 | Kocher | 117—85 |
| 2,652,346 | 9/1953 | Porzer | 117—148 |
| 2,875,076 | 2/1959 | Suchow | 106—193 |
| 2,955,958 | 10/1960 | Brown | 117—113 |
| 2,956,903 | 10/1960 | Spencer | 117—76 |

FOREIGN PATENTS

| 342,211 | 1/1931 | Great Britain. |
|---|---|---|
| 499,334 | 1/1939 | Great Britain. |

JOSEPH B. SPENCER, *Primary Examiner.*

RICHARD D. NEVIUS, *Examiner.*